(12) United States Patent
Fang et al.

(10) Patent No.: US 6,861,986 B2
(45) Date of Patent: Mar. 1, 2005

(54) MULTIFREQUENCY INVERTED-F ANTENNA

(75) Inventors: Chien-Hsing Fang, Taipei Hsien (TW);
Yuan-Li Chang, Taipei Hsien (TW);
Huey-Jen Lin, Taipei Hsien (TW)

(73) Assignee: Wistron Neweb Corporation, Taipei Hsien (TW)

( * ) Notice: Subject to any disclaimer, the term of this patent is extended or adjusted under 35 U.S.C. 154(b) by 0 days.

(21) Appl. No.: 10/394,370

(22) Filed: Mar. 20, 2003

(65) Prior Publication Data
US 2004/0066334 A1 Apr. 8, 2004

(30) Foreign Application Priority Data
Oct. 8, 2002 (TW) .......................... 91123215 A

(51) Int. Cl.[7] .......................... H01Q 1/24; H01Q 13/10
(52) U.S. Cl. .................. 343/700 MS; 343/702
(58) Field of Search ................. 343/741, 906, 343/908, 700 MS, 846, 702

(56) References Cited
U.S. PATENT DOCUMENTS

| | | | |
|---|---|---|---|
| 5,181,044 A | * | 1/1993 | Matsumoto et al. ........ 343/752 |
| 6,173,445 B1 | * | 1/2001 | Robins et al. ............... 717/173 |
| 6,343,208 B1 | | 1/2002 | Ying ........................... 455/90 |
| 6,404,394 B1 | | 6/2002 | Hill ............................. 343/702 |
| 6,426,725 B2 | * | 7/2002 | Hiroshima et al. ......... 343/741 |
| 6,600,448 B2 | | 7/2003 | Ikegaya et al. ...... 343/700 MS |
| 6,662,028 B1 | * | 12/2003 | Hayes et al. ............. 455/575.7 |

* cited by examiner

*Primary Examiner*—Don Wong
*Assistant Examiner*—Minh Dieu A
(74) *Attorney, Agent, or Firm*—Merchant & Gould P.C.

(57) ABSTRACT

A multifrequency inverted-F antenna includes a radiating element having opposite first and second ends, a grounding element spaced apart from the radiating element, and an interconnecting element extending between the radiating and grounding elements and including first, second, and third parts. The first part is connected to the radiating element at a feeding point between the first and second ends. The second part is offset from the first part in a longitudinal direction, and is connected to the grounding element. The third part interconnects the first and second parts. A feeding line is connected to the interconnecting element.

13 Claims, 4 Drawing Sheets

MULTIFREQUENCY INVERTED-F ANTENNA

CROSS-REFERENCE TO RELATED APPLICATION

This application claims priority of Taiwan patent Application No. 091123215, filed on Oct. 8, 2002.

BACKGROUND OF THE INVENTION

1. Field of the Invention

This invention relates to an antenna, more particularly to a multifrequency inverted-F antenna for a portable electronic device.

2. Description of the Related Art

Wireless communication devices, such as cellular phones, notebook computers, electronic appliances, and the like, are normally installed with an antenna that serves as a medium for transmission and reception of electromagnetic signals. The antenna can be built outside or inside the devices. However, the latter (built-in type) are more attractive due to a tendency of folding and breaking associated with the former upon use.

FIG. 1 illustrates a conventional multifrequency Planar Inverted-F Antenna (PIFA) which includes a rectangular conductive radiating element 11 having opposite left and right ends, a rectangular conductive grounding element 12 that is vertically spaced apart from and that is electrically connected to the left end of the radiating element 11 through a conductive grounding leg 13, and a conductive signal feeding element 14 that is electrically connected to one side of the radiating element 11 at a feeding point between the left and right ends of the radiating element 11, that extends through an opening in the grounding element 12, and that is adapted to be electrically connected to a radio frequency transceiver (not shown). The length (L1) measured from the left end of the radiating element 11 to the feeding point is different from the length (L2) measured from the feeding point to the right end of the radiating element 11 so that two different frequency bands corresponding respectively to L1 and L2 (each length is about $\lambda/4$, wherein $\lambda$ is the corresponding wavelength) can be emitted by the radiating element 11 when a signal is sent from the transceiver through the signal feeding element 14 to the radiating element 11.

FIG. 2 illustrates a conventional inverted-F antenna which is similar to the antenna shown in FIG. 1, except that the radiating element 11' is in the form of a wire. The antenna of this type can only resonate in a single frequency band.

In view of the conventional inverted-F antennas, there is a need for a simpler structure and construction for the antennas that are capable of emitting and receiving multifrequency bands. Moreover, adjustment of the frequency bands through the input and output impedance is not possible for the conventional inverted-F antennas due to the fixed location of the signal feeding element 14 on the radiating element 11.

SUMMARY OF THE INVENTION

Therefore, it is an object of the present invention to provide a multifrequency inverted-F antenna that is capable of overcoming the aforementioned drawbacks of the prior art.

According to this invention, there is provided a multifrequency inverted-F antenna that comprises: a conductive radiating element extending in a longitudinal direction and having opposite first and second ends lying in the longitudinal direction; a conductive grounding element spaced apart from the radiating element in a transverse direction relative to the longitudinal direction; a conductive interconnecting element extending between the radiating and grounding elements and including first, second, and third parts, the first part being electrically connected to the radiating element at a feeding point between the first and second ends of the radiating element, the second part being offset from the first part in the longitudinal direction and being electrically connected to the grounding element, the third part electrically interconnecting the first and second parts; and a feeding line electrically connected to the interconnecting element.

BRIEF DESCRIPTION OF THE DRAWINGS

In drawings which illustrate embodiments of the invention.

DETAILED DESCRIPTION OF THE PREFERRED EMBODIMENTS

Figure 1:
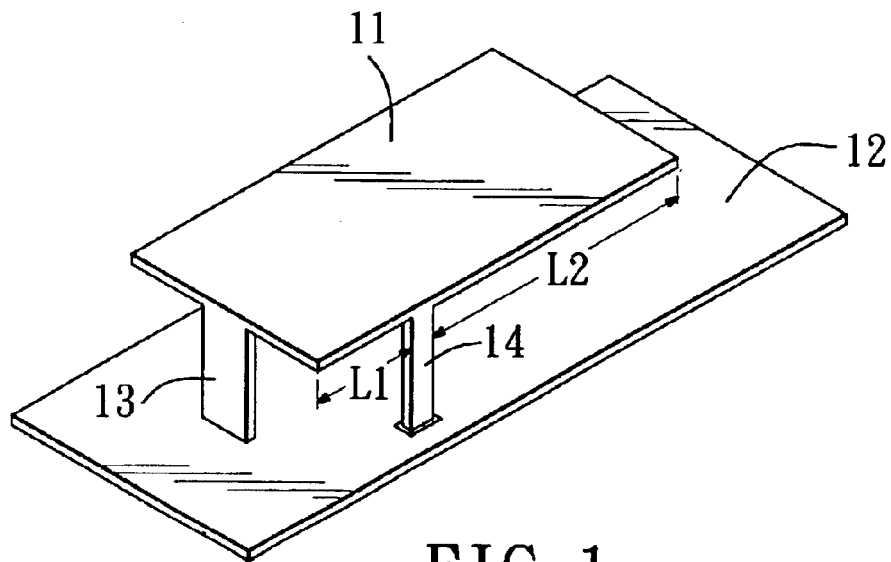
FIG. 1 is a perspective view of a conventional multifrequency planar inverted-F antenna.
Figure 2:
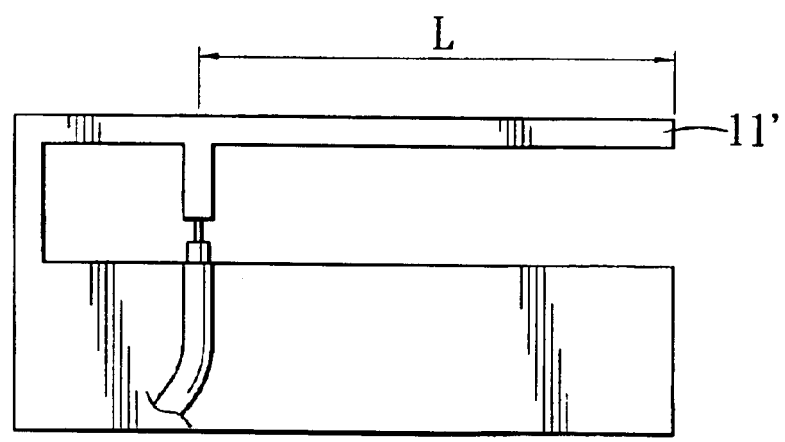
FIG. 2 is a top view of another conventional inverted-F antenna.

For the sake of brevity, like elements are denoted by the same reference numerals throughout the disclosure.

Figure 3:
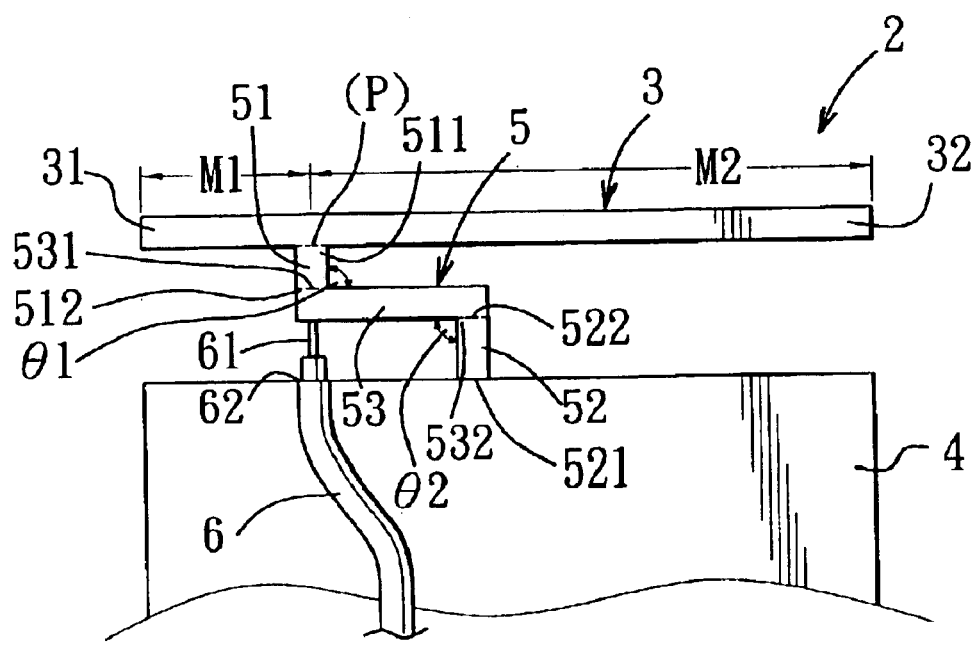
FIG. 3 is a fragmentary schematic view of a first preferred embodiment of a multifrequency inverted-F antenna of this invention, which has a radiating element in the form of a wire.
Figure 4:
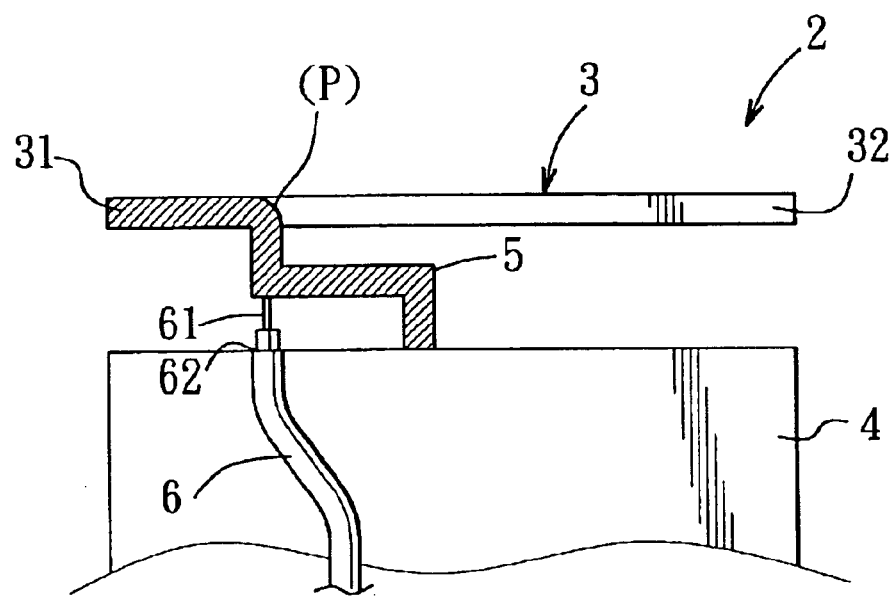
FIG. 4 is a schematic view to illustrate a signal path corresponding to a first frequency band from a grounding element to one end of the radiating element of the multifrequency inverted-F antenna of FIG. 3.
Figure 5:
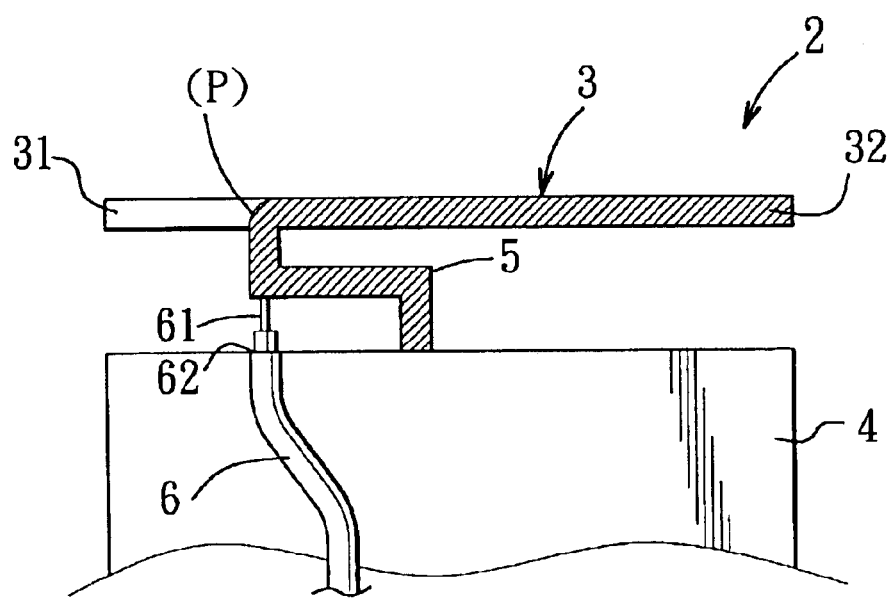
FIG. 5 is a schematic view to illustrate another signal path corresponding to a second frequency band from the grounding element to an opposite end of the radiating element of the multifrequency inverted-F antenna of FIG. 3.

FIGS. 3 to 5 illustrate a first preferred embodiment of a multifrequency inverted-F antenna 2 of this invention. The antenna 2 includes: a conductive radiating element 3 in the form of a wire that extends in a longitudinal direction and that has opposite first and second ends 31, 32 lying in the longitudinal direction; a conductive grounding element 4 spaced apart from the radiating element 3 in a transverse direction relative to the longitudinal direction; a conductive interconnecting element 5 extending between the radiating and grounding elements 3, 4 and including first, second, and third parts 51, 52, 53, the first part 51 being electrically connected to the radiating element 3 at a feeding point (P) between the first and second ends 31, 32 of the radiating element 3, the second part 52 being offset from the first part 51 in the longitudinal direction and being electrically connected to the grounding element 4, the third part 53 electrically interconnecting the first and second parts 51, 52; and a feeding line 6 electrically connected to the interconnecting element 5.

The first part 51 of the interconnecting element 5 has a radiating end 511 that is electrically connected to the radiating element 3 at the feeding point (P), and a distal end 512 that is opposite to the radiating end 511. The second part 52 of the interconnecting element 5 has a grounding end 521 that is electrically connected to the grounding element 4, and a distal end 522 that is opposite to the grounding end 521. The third part 53 of the interconnecting element 5 has opposite left and right ends 531, 532 electrically and respectively connected to the distal ends 512, 522 of the first and second parts 51, 52.

The first and third parts 51, 53 form a first angle (θ1), and the second and third parts 51, 52 form a second angle (θ2). Each of the first and second angles (θ1, θ2) can be varied. In this preferred embodiment, each of the first and second angles (θ1, θ2) is equal to 90°.

The grounding element 4 is in the form of a plate, and preferably extends in a direction parallel to the radiating element 3. The first and second parts 51, 52 preferably extend in a direction perpendicular to the radiating and grounding elements 3, 4.

Preferably, the feeding line 6 is in the form of a coaxial cable line connected to a radio frequency transceiver (not shown), and includes a core conductor 61 that is electrically connected to the interconnecting element 5. The core conductor 61 of the feeding line 6 is preferably connected to the third part 53, and is more preferably connected to the left end 531 of the third part 53 of the interconnecting element 5 at one side face of the third part 53 that is opposite to the distal end 512 of the first part 51 of the interconnecting element 5. The feeding line 6 further includes a grounding layer 62 that is electrically connected to the grounding element 4.

Figure 6:
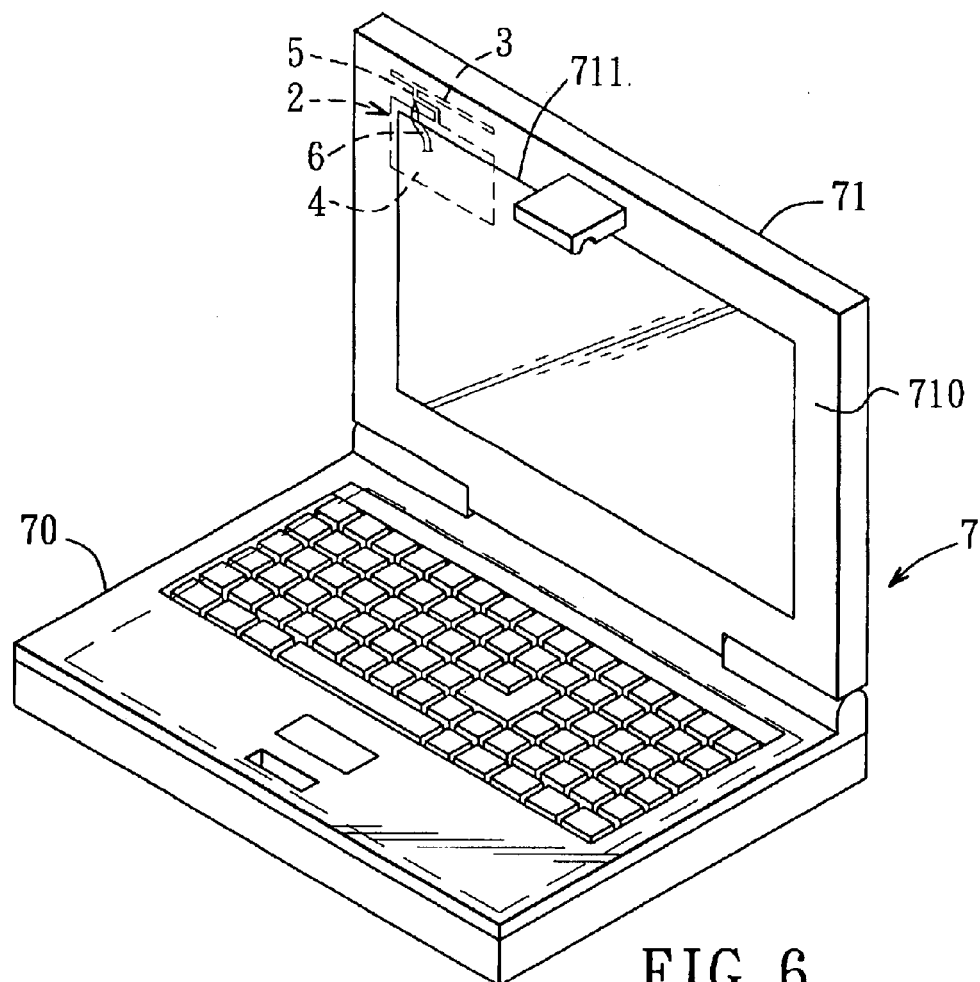
FIG. 6 is a perspective view of a notebook computer with the multifrequency inverted-F antenna of FIG. 3 installed therein.
Figure 7:
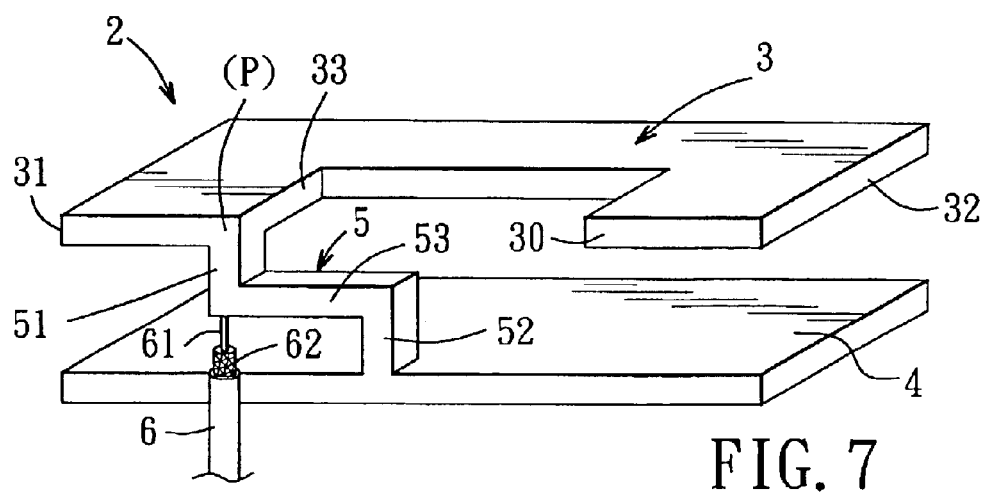
FIG. 7 is a perspective view of a second preferred embodiment of the multifrequency inverted-F antenna of FIG. 3, with the radiating element being in the form of a plate.

The feeding point (P) divides the radiating element 3 into left and right sections that have lengths (M1, M2) measured respectively from the left end 31 of the radiating element 3 to the feeding point (P) and from the feeding point (P) to the right end 32 of the radiating element 3. The left and right sections of the radiating element 3 correspond respectively to a high frequency band and a low frequency band. FIGS. 6 and 7 respectively illustrate signal paths that pass respectively through the first and second sections of the radiating element 3 when the radiating element 3 resonates at the corresponding frequency bands.

During transmission of a signal from the transceiver to the radiating element 3, part of the signal may be transmitted to the grounding element 4. However, due to hindrance of the second angle (θ2), most of the signal will be transmitted to the radiating element 3 so as to permit emission of a radiation in the frequency bands. During reception of a signal, the signal passes through the respective section of the radiating element 3 and is first fed to the feeding line 6 through the first part 51 of the interconnecting element 5 prior to transmission to the grounding element 4 which is placed behind the feeding line 6. Although part of the signal may be fed to the grounding element 4, however, due to hindrance of the first and second angles (θ1, θ2), most of the signal will be fed to the feeding line 6 so as to be received by the transceiver.

It is noted that it is not necessary to connect the core conductor 61 of the feeding line 6 to the left end 531 of the third part 53. The core conductor 61 can be connected to the third part 53 at a selected position between the left and right ends 531, 532 of the third part 53 so as to obtain a desired frequency band and impedance matching for the input and output impedance.

FIG. 7 illustrates a second preferred embodiment of the multifrequency inverted-F antenna 2 which has a construction similar to the antenna 2 shown in FIG. 3, except that the radiating element 3 is in the form of a plate. The radiating element 3 is rectangular in shape and has a side edge 30. The radiating end 511 of the first part 51 is connected to the side edge 30. The side edge 30 of the radiating element 3 is formed with a groove 33 between the feeding point (P) and the second end 32 of the radiating element 3 so as to increase the length of the current path between the feeding point (P) and the second end 32 of the radiating element 3 and so as to minimize the dimension of the radiating element 3 in the longitudinal direction.

FIG. 6 illustrates a portable electronic device, such as a notebook computer 7, with the antenna 2 of FIG. 3. The notebook computer 7 includes a main board module 70 and a display 71 that is connected to the main board module 70 and that has a display housing 710 and a display unit 711 mounted in the display housing 710. The antenna 2 is mounted in the display housing 710 with the grounding element 4 being electrically connected to a back plate of the display unit 711.

Tables 1 and 2 are results of a test on the antenna 2 of FIG. 3 by measuring the voltage Standing Wave Ratio (VSWR) in a first frequency band ranging from 2.4 to 2.5 GHz (which is close to a frequency band 2.412 to 2.4835 GHz according to the specifications of wireless standards of IEEE802.11b) and in a second frequency band ranging from 5.15 to 5.825 GHz (which is close to a frequency band 5.15 to 5.85 GHz according to the specifications of wireless standards of IEEE802.11a). The VSWR value is an indication of the quality of the antenna, and is preferably less than 2 so as to prevent interference during transmission or reception of signals. Tables 1 and 2 show that the VSWR values for the tested frequency bands are less than 2, and that the antenna 2 is capable of providing multifrequency bands.

TABLE 1

| Frequency, GHz | 2.4 | 2.45 | 2.5 |
|---|---|---|---|
| VSWR | 1.59 | 1.26 | 1.102 |

TABLE 2

| Frequency, GHz | 5.15 | 5.25 | 5.35 | 5.47 | 5.825 |
|---|---|---|---|---|---|
| VSWR | 1.481 | 1.564 | 1.323 | 1.192 | 1.769 |

In addition, the antenna 2 can be made from a flexible print circuit (FPC) material so as to further minimize the dimensions of the antenna 2.

By virtue of the construction of the interconnecting element 5, the drawbacks as encountered in the prior art can be eliminated.

With the invention thus explained, it is apparent that various modifications and variations can be made without departing from the spirit of the present invention.

We claim:

1. A multifrequency antenna comprising:
   a conductive radiating element extending in a longitudinal direction and having opposite first and second ends lying in said longitudinal direction;
   a conductive grounding element spaced apart from said radiating element in a transverse direction relative to said longitudinal direction;
   a conductive interconnecting element extending between said radiating and grounding elements and including first, second, and third parts, said first part being electrically connected to said radiating element at a feeding point between said first and second ends of said radiating element, said second part being offset from said first part in said longitudinal direction and being electrically connected to said grounding element, said third part electrically interconnecting said first and second parts; and a feeding line electrically connected to said interconnecting element.

2. The multifrequency antenna of claim 1, wherein said feeding line is electrically connected to said third part of said interconnecting element.

3. The multifrequency antenna of claim 1, wherein said first part of said interconnecting element has a radiating end that is electrically connected to said radiating element at said feeding point, and a distal end that is opposite to said radiating end, said second part of said interconnecting element having a grounding end that is electrically connected to said grounding element, and a distal end that is opposite to said grounding end, said third part of said interconnecting element having opposite left and right ends electrically and respectively connected to said distal ends of said first and second parts.

4. The multifrequency antenna of claim 3, wherein said feeding line is electrically connected to said left end of said third part of said interconnecting element.

5. The multifrequency antenna of claim 4, wherein said first and second parts form a first angle is equal to 90°.

6. The multifrequency antenna of claim 5, wherein said second and third parts form a second angle is equal to 90°.

7. The multifrequency antenna of claim 6, wherein said feeding line is electrically connected to said left end of said third part of said interconnecting element.

8. The multifrequency antenna of claim 6, wherein said grounding element extends in a direction substantially parallel to said radiating element.

9. The multifrequency antenna of claim 8, wherein said first and second parts of said interconnecting element extend in a direction substantially perpendicular to said radiating elements.

10. The multifrequency antenna of claim 9, wherein said radiating element is in the form of a strip.

11. The multifrequency antenna of claim 9, wherein said radiating element is in the form of a plate.

12. The multifrequency antenna of claim 11, wherein said radiating element is rectangular in shape and has a side edge, said radiating end of said first part being connected to said side edge, said side edge being formed with a groove between said feeding point and said second end of said radiating element.

13. The multifrequency antenna of claim 1, wherein the length of said radiating element measured from said first end to said feeding point is shorter than that from said feeding point to said second end.

* * * * *

(12) EX PARTE REEXAMINATION CERTIFICATE (6754th)

United States Patent
Fang et al.

(10) Number: US 6,861,986 C1
(45) Certificate Issued: Apr. 7, 2009

(54) MULTIFREQUENCY INVERTED-F ANTENNA

(75) Inventors: Chien-Hsing Fang, Taipei Hsien (TW); Yuan-Li Chang, Taipei Hsien (TW); Huey-Jen Lin, Taipei Hsien (TW)

(73) Assignee: Wistron Neweb Corporation, HsiChih, Taipei Hsien (TW)

Reexamination Request:
No. 90/007,652, Jul. 28, 2005

Reexamination Certificate for:
Patent No.: 6,861,986
Issued: Mar. 1, 2005
Appl. No.: 10/394,370
Filed: Mar. 20, 2003

(30) Foreign Application Priority Data

Oct. 8, 2002 (TW) .................................. 91123215 A

(51) Int. Cl.
*H01Q 1/24* (2006.01)
*H01Q 5/00* (2006.01)
*H01Q 1/22* (2006.01)
*H01Q 9/04* (2006.01)

(52) U.S. Cl. .................................. 343/700 MS; 343/702
(58) Field of Classification Search .................. None
See application file for complete search history.

(56) References Cited

U.S. PATENT DOCUMENTS 6,229,485 B1 5/2001 Ito et al.
6,239,765 B1 5/2001 Johnson et al.
6,788,257 B2 9/2004 Fang et al.

*Primary Examiner*—Charles Craver

(57) ABSTRACT

A multifrequency inverted-F antenna includes a radiating element having opposite first and second ends, a grounding element spaced apart from the radiating element, and an interconnecting element extending between the radiating and grounding elements and including first, second, and third parts. The first part is connected to the radiating element at a feeding point between the first and second ends. The second part is offset from the first part in a longitudinal direction, and is connected to the grounding element. The third part interconnects the first and second parts. A feeding line is connected to the interconnecting element.

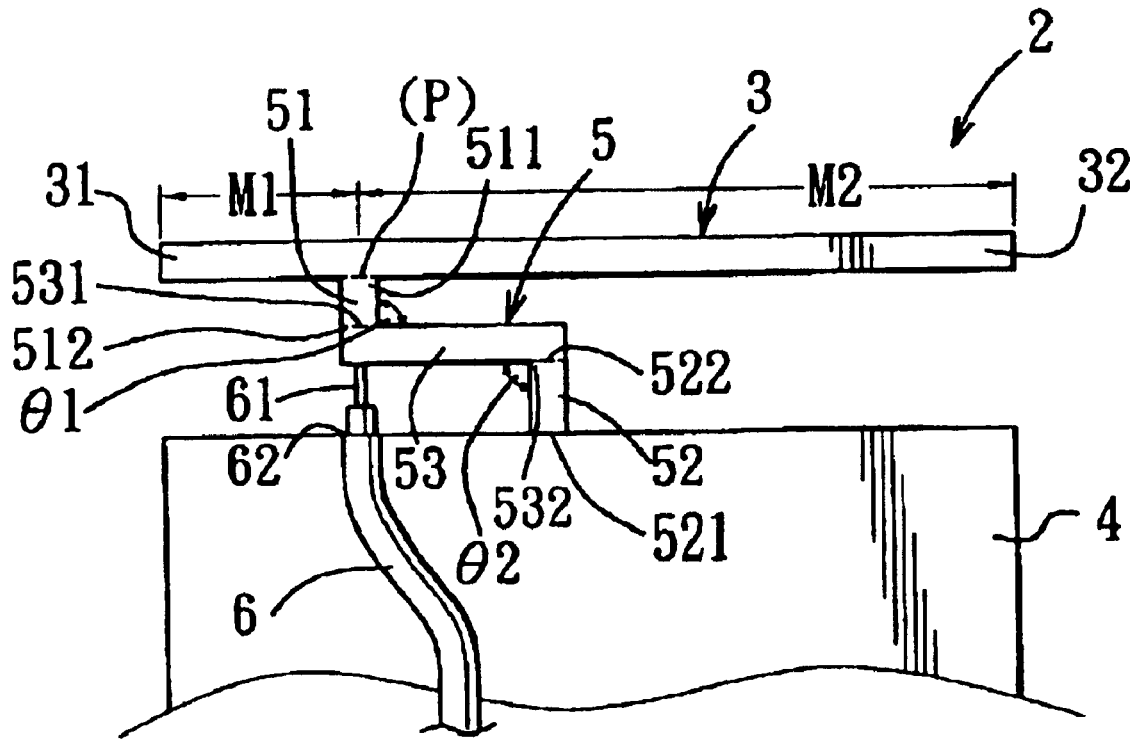

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE
SPECIFICATION AFFECTED BY AMENDMENT
ARE PRINTED HEREIN.

Column 1, lines 25–45:

FIG. 1 illustrates a conventional [multifrequency] *single-frequency* Planar Inverted-F Antenna (PIFA) which includes a rectangular conductive radiating element 11 having opposite left and right ends, a rectangular conductive grounding element 12 that is vertically spaced apart from and that is electrically connected to the left end of the radiating element 11 through a conductive grounding leg 13, and a conductive signal feeding element 14 that is electrically connected to one side of the radiating element 11 at a feeding point between the left and right ends of the radiating element 11, that extends through an opening in the grounding element 12, and that is adapted to be electrically connected to a radio frequency transceiver (not shown). [The length (L1) measured from the left end of the radiating element 11 to the feeding point is different from the length (L2) measured from the feeding point to the right end of the radiating element 11 so that two different frequency bands corresponding respectively to L1 and L2 (each length is about λ/4, wherein λ is the corresponding wavelength) can be emitted by the radiating element 11 when a signal is sent from the transceiver through the signal feeding element 14 to the radiating element 11.] *The resonant frequency (λ) of this conventional PIFA can be estimated based on the width (Wr) and length (Lr) of the rectangular conductive radiating element 11, the width (Wg) of conductive grounding leg 13, and the distance (D) between radiating element 11 and grounding element 12. Normally λ/4 is about the value of Lr+Wr. If Wg=Wr, then λ/4=Lr+D. When Wg approaches zero (a very narrow grounding leg), the resonant condition is: λ/4=Lr+Wr+D. The impedance matching can be tuned by adjusting the distance between the feed point and the grounding leg 13.*

AS A RESULT OF REEXAMINATION, IT HAS BEEN DETERMINED THAT:

The patentability of claims 1–13 is confirmed.

\* \* \* \* \*